3,302,202
APPARATUS FOR COMPARING THE AMPLITUDE OF TWO SIGNALS OF DIFFERENT FREQUENCIES
Geoffrey George Gouriet, Chessington, England, assignor to The Wayne Kerr Laboratories Limited, Surrey, England, a British company
Filed Jan. 15, 1964, Ser. No. 337,810
Claims priority, application Great Britain, Jan. 16, 1963, 2,025/63
30 Claims. (Cl. 343—109)

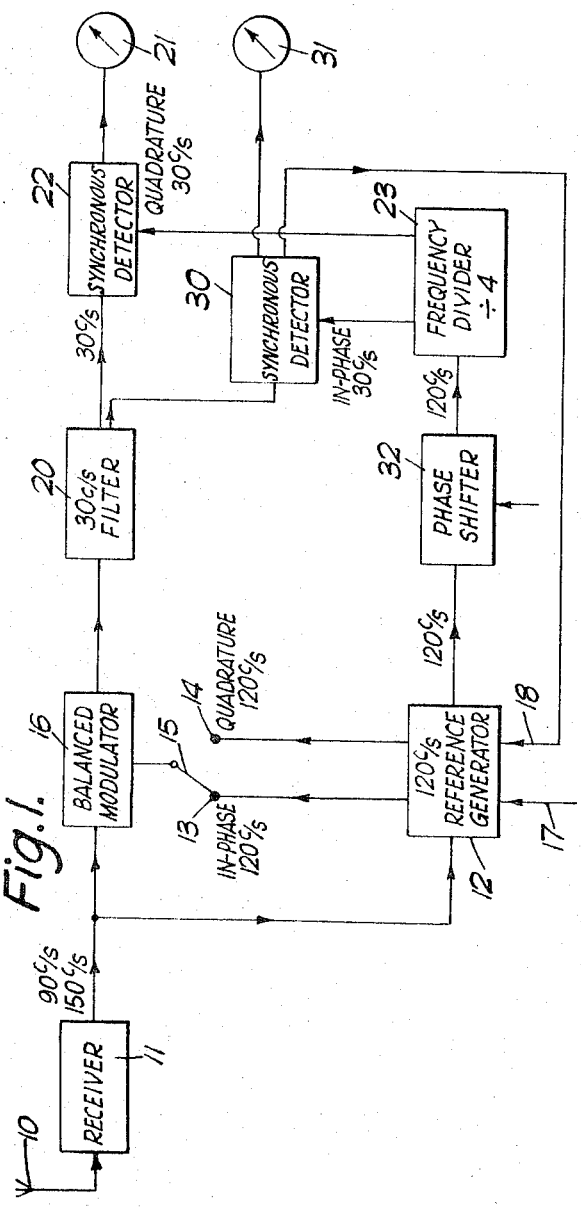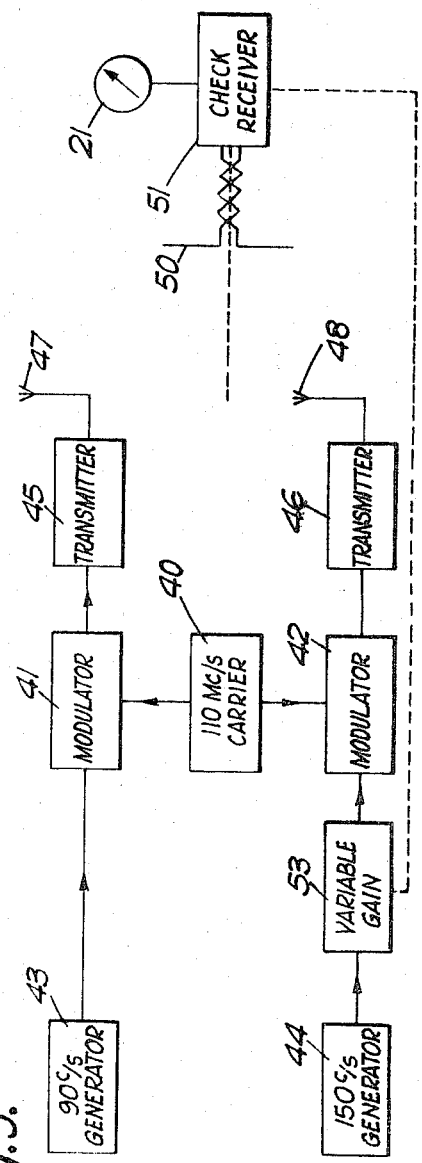

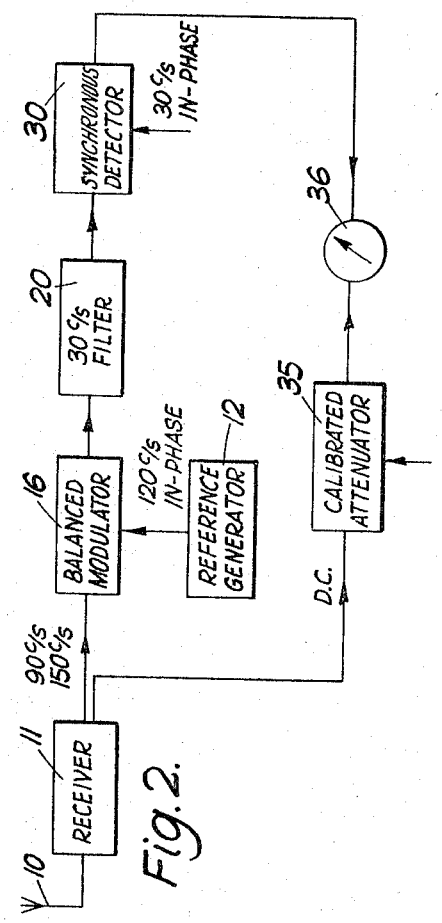
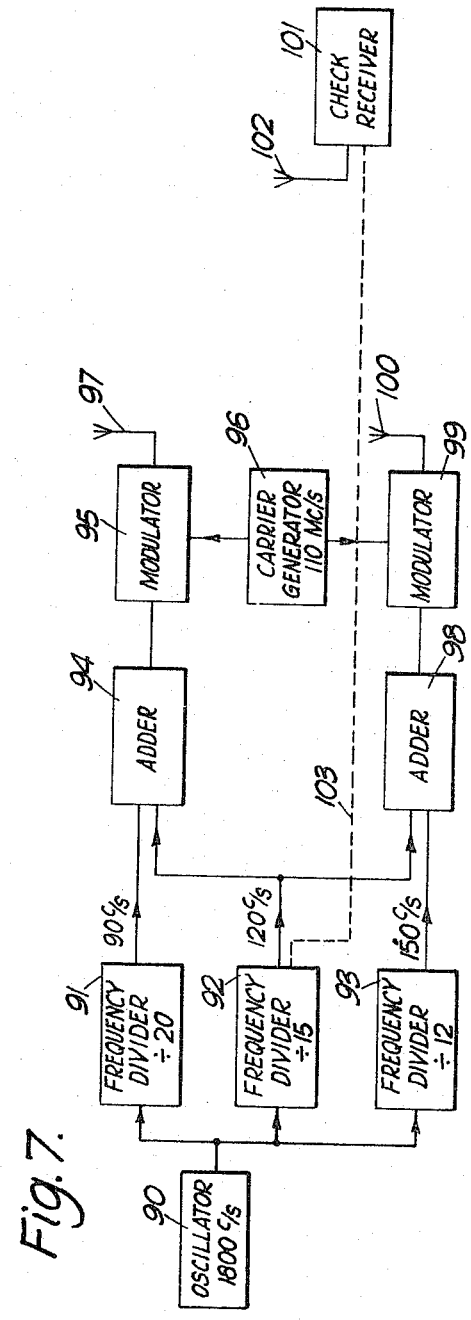

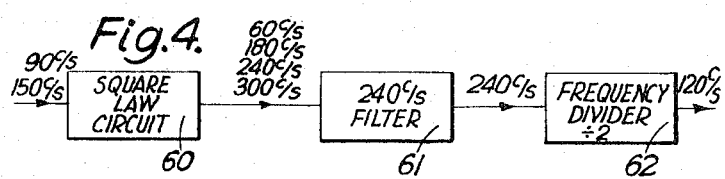
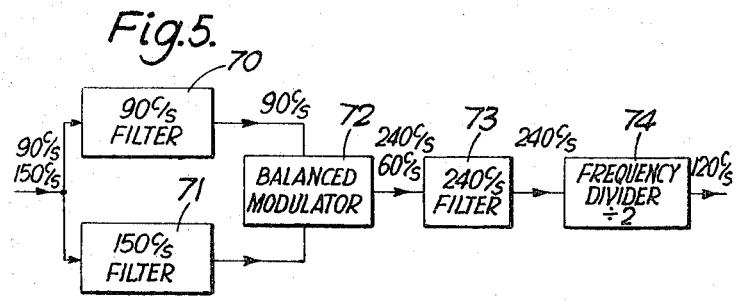
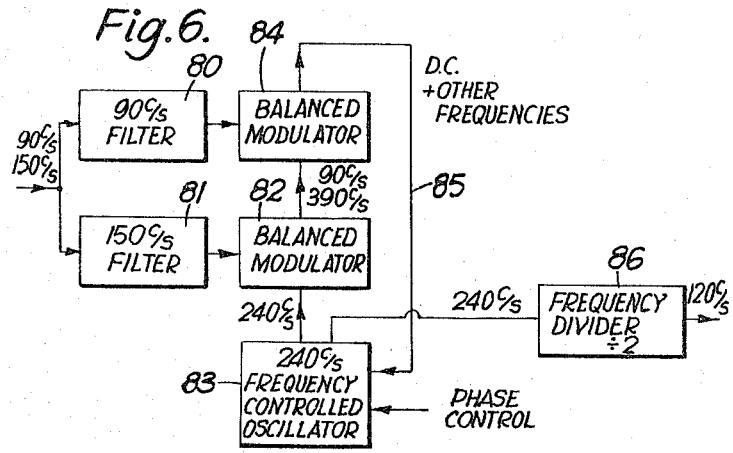

This invention relates to apparatus for comparing the amplitude of two signals of different frequency and particularly for comparing the amplitudes of modulation of two modulation signals of different frequency on a single carrier.

In the aircraft landing approach system known as I.L.S. (Instrument Landing System) guidance in the azimuth plane for the approach of an aircraft to a runway for landing is given by means of two directional radio beams having the same carrier frequency, one being modulated at a frequency of 90 cycles per second and the other at a frequency of 150 cycles per second. The two beams partially overlap to give an equi-signal path indicating the line of approach to the runway. In the I.L.S. system glide path indication is also given in a somewhat similar manner using two beams of another carrier frequency each of which beams is modulated with a respective one of two modulation frequencies. It has been proposed that the azimuth guidance part of the I.L.S. equipment could be utilized not only for approach to a runway but control in the azimuth plane for blind landing of an aircraft but such a blind landing system requires a much higher order of accuracy than approach guidance. Heretofore comparison of the amplitude of modulation of the two different frequency signals on a single carrier has been effected by demodulating the carrier wave and using filters to separate the two different frequency modulation signals and then comparing, in amplitude, the separated modulation signals. The insertion losses of the filters will necessarily affect the amplitudes of the two separated signals to be compared and hence the accuracy of the comparison of the modulation signals. It is one of the objects of the present invention to provide means enabling comparisons to be made of the amplitudes of two modulation signals of two different frequencies on a common carrier without having to separate these two signals. More generally however the invention can be applied to any comparison of the amplitudes of two signals of different frequencies.

According to this invention apparatus for comparing the amplitudes of two input signals of different frequencies comprises a signal source providing a reference signal of a frequency exactly midway between that of said two input signals, means for adjusting the phase of the reference signal (i.e. the mean frequency signal), a balanced amplitude modulator for modulating the phase-adjusted mean frequency signal with the combined input signals and a detector for detecting the amplitude of the output signal from the balanced modulator at a frequency equal to half the difference between the frequencies of the two input signals.

The expression "balanced modulator" is used in this specification to mean any device which acts as a multiplier of two electrical signals; that is to say a device giving an output the instantaneous amplitude of which is equal to the product of the instantaneous amplitudes of the inputs. As will be explained later, by adjusting the phase adjusting means to give minimum output on the detector, the amplitude of the detector output is then representative of the difference in the amplitudes of the two input signals and is zero when these two signals are equal. By this arrangement, equality of the amplitude of two input signals of different frequency can be determined to an extremely high order of accuracy, for example to the order of 1 part in 5,000 or 10,000. This is a very much higher order of accuracy than is possible in any arrangement in which the two signals to be compared in amplitude have to be separated by the use of filters.

The aforementioned signal source may comprise means for deriving the mean frequency signal from said two input signals. The amplitude of the mean frequency signal is not critical and since its phase can be adjusted by the phase adjusting means, such a mean frequency signal can readily be obtained from the two input signals. For example, one means for obtaining this mean frequency signal comprises means for combining the two input signals to produce a signal containing components of frequency equal to the sum and difference frequencies of the two input signals, a filter for separating the sum frequency signal and a frequency divider for dividing the frequency of the separated sum frequency output of the filter by a factor of two. The sum frequency may readily be obtained by using a non-linear circuit such as a square law device followed by a filter tuned to twice the mean frequency, that is to say 240 cycles per second for the I.L.S. equipment. A square law device will give an output amplitude proportional to the square of the input amplitude. The non-linear circuit may produce harmonics as well as sum and difference frequencies but the required sum frequency signal will be selected by the filter.

Another arrangement for obtaining the mean frequency signal from the aforesaid two input signals comprises a controllable frequency generator for producing a signal at approximately twice the mean frequency, means for combining the output of the generator with one of the input signals to produce sum and difference frequencies, means for combining the sum and difference frequencies with the other input signal to produce a control signal, the direct current component of which is used to control the frequency of said generator to minimize the amplitude of said direct current component, and means for obtaining from said oscillator an output signal at half the frequency of the aforesaid output of the generator which is fed to the combining means. It may be convenient to use, as said generator, an oscillator which oscillates at twice the required mean frequency and to have a frequency divider for obtaining the mean frequency signal but it will be immediately obvious that many other circuit arrangements are possible.

In the above described apparatus, the detector for detecting the amplitude of the output signal from the balanced modulator is preferably a synchronous detector having a reference signal of a frequency equal to half the difference frequency of the input signals and having a phase such that the detector detects the required output, at half the difference frequency, from the balanced modulator but discriminates against the quadrature signal due to any unwanted component of this frequency which could arise, as described, due to a phase error of the reference signal fed to the balanced modulator. As will be explained later these two components are in phase quadrature and thus can be separately detected by the use of two synchronous detectors having reference inputs in phase quadrature. In an I.L.S. system the 30 c./s. reference signal required for the synchronous detector or detectors may be derived from the 120 c./s. reference signal, e.g. by a frequency divider. More generally however a reference signal at half the difference frequency can be derived from the two inputs.

For detecting the quadrature component in the output from the balanced modulator, there may be provided a second synchronous detector having a reference signal of the same frequency as that for the first synchronous detector but in quadrature therewith and means for indicating the output of the second synchronous detector. By this means it is possible to indicate separately any phase error in the reference signal to the balanced modulator, that is the 120 c./s. signal in an I.L.S. system. A phase shifter may be provided for adjusting the phase of the reference signals for the synchronous detectors.

Control means may be provided for automatically controlling the phase of the reference signal for the balanced modulator in accordance with the output of the second synchronous detector so as to tend to bring that output to a minimum. It is thus readily possible to control the phase of this reference signal automatically so as to hold it in the required condition.

The arrangement of the present invention finds particular application, for example, as a check receiver at a fixed location on the ground for checking the accuracy of the azimuth guidance line defined by the I.L.S. transmissions. For this purpose, there is provided, at a point on the required course line, a receiver for receiving the I.L.S. transmissions and for demodulating the received signals to provide a combined output having these two frequencies (which as mentioned above are conventionally 150 c./s. and 90 c./s.), and the output of this demodulator is fed to a balanced modulator to amplitude modulate a signal of (assuming the above frequencies) 120 c./s. which latter signal is fed through the phase adjusting means to the balanced modulator and the detector is arranged to detect the 30 c./s. output from the balanced modulator. The 120 c./s. reference signal may be generated in the check receiver or be derived directly from the I.L.S. equipment either by the additional radiation of a 120 c./s. modulation as the reference signal or by a land line direct from the modulation source. The 120 c./s. signal may be readily provided in the I.L.S. transmitting equipment, for example, if the required modulation signals are derived from an oscillator operating at 1800 c./s. using three separate dividers dividing by factors of 12, 15 and 20 respectively to produce signals of the frequencies 150 c./s. 120 c./s. and 90 c./s.

Such a ground based check receiver may be used not only as a monitor for checking the accuracy of the transmissions but may be used, additionally or alternatively, as a control receiver to provide an output for controlling the relative amplitudes of the modulations at the transmitter so as to maintain automatically the required accuracy of the azimuth guidance line.

The system of the present invention can also be used in an aircraft as the airborne receiver for determining equality of the two modulation signals radiated by the ground base transmitters of the I.L.S. equipment. In this case the mean frequency signal may be obtained either by transmitting a reference signal at this frequency from the ground equipment, or by producing the mean frequency signal in the aircraft from the two modulation signals as previously described. The detector on the aircraft would be a phase sensitive detector to give the sense of the deviation from the required course. By suitably controlling the phase of the 120 c./s. reference signal before it is radiated, it would be possible to avoid having to provide phase adjusting means in the aircraft receiver.

In any arrangement in which the 120 c./s. signal is transmitted from the ground based I.L.S. equipment, it may be convenient to radiate this signal as a further modulation on the same carrier frequency as the existing modulations. In this case the transmissions must be such as to avoid generating any spurious 30 c./s. component in the receiver and, for this purpose the reference signal if it is on the same carrier frequency as the two modulation signals to be compared, is preferably transmitted in the required phase relationship with the two modulation signals used for guidance. If this is done, there is no requirement to provide an adjustable phase shifter in the airborne equipment or in the ground-based check receiver, the phase of the mean frequency signal being appropriately controlled in the transmitting equipment.

It will be particularly noted that the above described form of ground-based check receiver for I.L.S. equipment may be used with existing I.L.S. installations without in any way affecting the operation of the I.L.S. equipment or requiring any modification thereof. Similarly the aircraft receivers of the present invention may be used with existing I.L.S. transmissions if the required mean frequency signal is derived in the aircraft from the 90 c./s. and 150 c./s. signals in the manner described above. In this case the aircraft equipment will require the adjustment of the phase adjusting means to give minimum amplitude on the detector and then the equipment is used in the normal way, the aircraft being guided so as to fly along a path where there is zero indication on the detector. It will be noted moreover that this type of receiver may readily be used not only for the azimuth guidance of the aircraft but also for the guide path indication.

In the following description reference will be made to the accompanying drawings in which:

FIGURE 1 is a block diagram illustrating an equipment for comparing the amplitudes of modulation of two signals in an I.L.S. system;

FIGURE 2 is a diagram of apparatus for measuring the depth of modulation of signals from an I.L.S. system;

FIGURE 3 is a block diagram illustrating an I.L.S. system and showing how the equipment of FIGURE 1 can be used as a check receiver and for controlling the relative amplitudes of modulation;

FIGURES 4, 5 and 6 are diagrams illustrating different arrangements for deriving a mean frequency signal from two input signals for use in the apparatus of FIGURE 1; and FIGURE 7 is a diagram illustrating a manner of deriving the required mean frequency signal from the transmitter of an I.L.S. system.

In FIGURE 1 there is illustrated a check receiver for an I.L.S. system which can compare the relative amplitudes of the two modulation signals of different frequencies. As will be explained with reference to FIGURE 7, this apparatus can also be adapted to measure the depth of modulation of these two signals. In this description it will be assumed that the I.L.S. equipment operates with the standard modulation frequencies of 90 and 150 c./s. The radio frequency signals, typically having a frequency of the order of 110 mc./s., are received by an aerial 10 and are fed to a receiver and demodulator 11 which provides a demodulated output containing signals of the two modulation frequencies, 90 and 150 c./s. These demodulated signals are fed to a reference signal generator 12 which produces, from the two modulation frequency signals, a signal of the mean frequency, that is to say 120 c./s. This may be done in a number of ways and examples of suitable forms of reference signal generator for this purpose, are illustrated in FIGURES 4, 5 and 6 and will be described later. The reference signal generator 12 provides two outputs at 120 c./s. which are in phase quadrature. These two outputs are available at terminals 13 and 14 and either one of the two output signals can be selected by means of a switch 15 to be fed to a balanced modulator 16. This balanced modulator combines the selected output from the terminal 13 or 14 with the input from the receiver 11. A balanced modulator, as previously explained, is an amplitude multiplier, that is to say that at any instant the output from the balanced modulator is proportional to the product of the instantaneous values of the two input amplitudes.

Before proceeding further with the description of FIGURE 1 it is convenient at this stage to consider the mathematical explanation of the action of such a balanced modulator.

Consider a composite signal $F(t)$ comprising two sinusoidal signals of angular frequencies $\omega_1$ and $\omega_2$. This may be written $$F(t) = A \sin \omega_1 t + B \sin (\omega_2 t + \theta)$$

where A and B are the respective amplitudes and $\theta$ is the phase difference at $t=0$.

If $F(t)$ is applied to one input of a balanced modulator and a signal $$\cos\left(\frac{\omega_1 + \omega_2}{2}\right)t + \phi$$

is applied to the other input the output will be:

$$G(t) = (A \sin \omega_1 t + B \sin \overline{\omega_2 t + \theta})\left[\cos\overline{\left(\frac{\omega_1+\omega_2}{2}\right)t + \phi}\right]$$

$$= \frac{A}{2}\left[\sin\left(\omega_1 t + \frac{\omega_1 t}{2} + \frac{\omega_2 t}{2} + \phi\right) + \right.$$
$$\left.\sin\left(\omega_1 t - \frac{\omega_1 t}{2} - \frac{\omega_2 t}{2} - \phi\right)\right] +$$
$$\frac{B}{2}\left[\sin\left(\omega_2 t + \frac{\omega_1 t}{2} + \frac{\omega_2 t}{2} + \theta + \phi\right) + \right.$$
$$\left.\sin\left(\omega_2 t - \frac{\omega_1 t}{2} - \frac{\omega_2 t}{2} + \theta - \phi\right)\right]$$

$$= \frac{A}{2}\left[\sin\overline{\left(\omega_1 + \frac{\omega_1+\omega_2}{2}\right)t + \phi} + \sin\left(\frac{\omega_1 t}{2} - \frac{\omega_2 t}{2} - \phi\right)\right] +$$
$$\frac{B}{2}\left[\sin\overline{\left(\omega_2 + \frac{\omega_1+\omega_2}{2}\right)t + (\theta+\phi)} - \right.$$
$$\left.\sin\overline{\left(\frac{\omega_1 t}{2} - \frac{\omega_2 t}{2}\right) - (\theta - \phi)}\right]$$

Now let $\phi = \theta/2$, then $$G(t) = \frac{A}{2}\left[\sin\overline{\left(\omega_1 + \frac{\omega_1+\omega_2}{2}\right)t + \frac{\theta}{1}} + \sin\overline{\left(\frac{\omega_1-\omega_2}{2}\right)t - \frac{\theta}{2}}\right] +$$
$$\frac{B}{2}\left[\sin\overline{\left(\omega_2 + \frac{\omega_1+\omega_2}{2}\right)t + \frac{3\theta}{2}} - \sin\overline{\left(\frac{\omega_2-\omega_2}{2}\right)t - \frac{\theta}{2}}\right]$$

$$= \frac{A}{2}\left[\sin\overline{\left(\omega_1 + \frac{\omega_1+\omega_2}{2}\right)t + \frac{\theta}{2}}\right] +$$
$$\frac{B}{2}\left[\sin\overline{\left(\omega_2 + \frac{\omega_1+\omega_2}{2}\right)t + \frac{3\theta}{2}}\right] +$$
$$\frac{(A-B)}{2}\sin\overline{\left(\frac{\omega_1-\omega_2}{2}\right)t - \frac{\theta}{2}}$$

In general there are, therefore, three frequencies present in the output signal:

(1) $\omega_1$ + the mean frequency with amplitude $A/2$
(2) $\omega_2$ + the mean frequency with amplitude $B/2$
(3) half the difference frequency with amplitude $A-B/2$ If $A=B$ the component of half the difference frequency will disappear and its absence will thus indicate an equality in the amplitudes A and B.

It will thus be seen that, provided the phase of the reference signal is selected so that $\phi = \theta/2$ then, in the arrangement of FIGURE 1 there will be no component of half the difference frequency, that is to say of 30 c./s., in the output of the modulator 16 when the two input signals from the receiver 11 are of equal amplitude. The reference signal generator 12 is provided with a manual phase control indicated diagrammatically by the input 17 and also with an automatic phase control indicated diagrammatically by the input 18. These controls enable the phase of the outputs from the reference signal generator to be adjusted. The manner of effecting this adjustment will be described later and, for the present purposes, it will be assumed that, when the phase is appropriately adjusted the output at terminal 14 gives the required relationship $\phi = \theta/2$. The output signal from the balanced modulator 16 at half the difference frequency is selected by a 30 c./s. filter 20 and its magnitude is indicated on a meter 21. For this purpose the output from the filter 20 is detected by a synchronous detector 22 to give a direct current output for the meter 21. By using a synchronous detector, it is possible to discriminate between the 30 c./s. signal due to the amplitude difference of the incoming modulation signals at the receiver 11 and the 30 c./s. signal due to incorrect phase adjustment of the reference signal generator; the latter would be in phase quadrature to the required 30 c./s. signal and hence can be eliminated from the output fed to the meter by using the synchronous detector 22 with a phase reference derived from the output from reference generator 12. This phase reference standard for the synchronous detector 22 is obtained from the reference signal generator 12 by means of a frequency divider 23 which divides the output from the reference signal generator by a factor of four. In the arrangement of FIGURE 1, means are provided for checking the phase of the 120 c./s. reference signal. This checking means comprises a further synchronous detector 30 which detects the 30 c./s. output from the filter 20 using a reference standard from the divider 23 in quadrature with that used for the synchronous detector 22. The output from the detector 30 is indicated on a meter 31.

Assuming that A is the amplitude of the 90 c./s. signal, B the amplitude of the 150 c./s. signal, $\alpha$ is the phase error of the 120 c./s. reference signal and $\beta$ is the phase error of the 30 c./s. reference signal, then the output on the phase meter 21 may be expressed as:

$$A/2 \cos(\alpha - \beta) - B/2 \sin(\alpha + \beta)$$

The output on the meter 31 may be expressed as $$A/2 \sin(\alpha + \beta) + B/2 \sin(\alpha - \beta)$$

If the 30 c./s. reference signal is in the correct phase, that is to say $\beta = 0$, the output indicated on the phase meter 31 is $$A + B/2 \sin \alpha$$

The output on the relative amplitude meter 21 is $$A - B/2 \cos \alpha$$

It will be seen that any error $\alpha$ in the phase of the 120 c./s. reference signal will be shown on the meter 31. Small errors $\alpha$ will not however appreciably affect the reading on the meter 21 since, for small angles, $\cos \alpha$ is very close to unity. It will again be noted that, regardless of whether or not $\alpha$ is zero, if $A = B$, the amplitude meter 21 will give zero indication. Thus the check of equality of amplitude of the modulation signals is not affected by any phase error in the 120 c./s. reference signal. The reason for checking the phase of this reference signal is to guard against the possibility that, in certain circumstances, where there is an error in the phase of the 120 c./s. reference signal, there is also an error in the phase of the 30 c./s. reference signal. For example the error in the 30 c./s. reference signal could possibly be of the appropriate value such as would give a null indication on the meter 21 even if the modulation signal amplitudes were not equal. Thus if both the meters 21 and 31 read zero, there is equality of amplitude of the input signals. If the meter 31 does not read zero, the phase of the 120 c./s. reference signal should be adjusted to bring this meter reading to zero. The operation of the apparatus of FIGURE 1 will now be clear: with the switch 15 in the position to feed the quadrature output from the reference generator 12 to the balanced modulator 16, the phase control of the 120 c./s. from the reference generator is adjusted if necessary to give a null indication on the meter 31. Then equality of amplitudes of the two modulation signals is indicated by a null indication on the meter 21. Small phase errors in the 120 c./s. signal are immaterial and the apparatus may readily be made with sufficient phase stability that phase checking and possible re-adjustment is only occasionally necessary. For many purposes therefore it may be sufficient to adjust manually the phase of the output from the reference generator 12. In FIGURE 1, however, there is illustrated an automatic phase control system for maintaining the requisite phase from the output from the reference generator 12. The output from the synchronous detector 30 which is zero when the 120 c./s. has the required phase, is fed as a control signal for the automatic phase control input 18 of the reference generator 12. This control operates to adjust the phase of the 120 c./s. reference signal so as to keep the output from the synchronous detector 30 to a minimum. The automatic phase control system is thus responsive to any deviations in the phase of the 120 c./s. signal from the required condition and serves to control the reference generator to maintain the necessary phase condition.

To ensure that the 30 c./s. signal is in the correct phase, a manually adjustable phase shifter 32 is provided for adjusting the phase of the 30 c./s. reference signal. To obtain the correct adjustment of this phase shifter, the switch 15 is operated so that the in-phase component of the 120 c./s. reference signal is fed to the balanced modulator 16 and the phase adjusted until the output on indicator 21 is zero. In I.L.S. systems, it is the standard practice to maintain a particular phase relationship between the two modulation signals, namely that their instantaneous amplitudes both pass through zero, whilst going in the positive direction, at the same time. The 30 c./s. signal is derived from the 120 c./s. reference signal and its phase will be correct if it passes through zero and the two input signals also pass through zero at the same instant of time. If the two input signals do not pass through zero at the same time, it may be shown that the amount of the adjustment of the phase shifter 32 is dependent on the amount of the departure from this preferred phase condition of the two input signals. The phase shifter may thus be calibrated for measuring any such error.

By provision of the switch 15 it is possible to use the above described apparatus also for measuring the depth of modulation. This is particularly desirable in a ground check receiver for the I.L.S. system where it is required not only to check equality of the modulation signals on the required path line but also to confirm that the depth of modulation is correct. Heretofore in order to measure the depth of modulation of the signals on an I.L.S. system, it has been necessary to use filters to separate the two signals and then to measure the depths of modulation of the two signals separately. To determine the depth of modulation with the apparatus of FIGURE 1, the switch 15 is set to feed the in-phase output from the reference generator 12 to the balanced modulator 16. If this is done, the output of the detector 30 is then proportional to $A+B/2$ and hence to the depth of modulation. This manner of operation may be explained mathematically as follows:

If using the previous notation, the second input to the balanced modulator is now switched to be $$\sin\left(\frac{\omega_1+\omega_2}{2}\right)t+\frac{\theta}{2}$$

then $$G(t)=(A\sin\omega_1 t+B\sin\overline{\omega_2 t+\theta})\left[\sin\left(\frac{\omega_1+\omega_2}{2}\right)+\frac{\theta}{2}\right]$$

$$=\frac{A}{2}\left[\cos\left(\omega_1 t-\frac{\omega_1 t}{2}-\frac{\omega_2 t}{2}-\frac{\theta}{2}\right)-\cos\left(\omega_1 t+\frac{\omega_1 t}{2}+\frac{\omega_2 t}{2}+\frac{\theta}{2}\right)\right]+$$

$$\frac{B}{2}\left[\cos\left(\omega_2 t-\frac{\omega_1 t}{2}-\frac{\omega_2 t}{2}+\theta-\frac{\theta}{2}\right)-\cos\left(\omega_2 t+\frac{\omega_1 t}{2}+\frac{\omega_2 t}{2}+\theta+\frac{\theta}{2}\right)\right]$$

$$=\frac{A}{2}\left[\cos\left(\frac{\omega_1-\omega_2}{2}\right)t-\frac{\theta}{2}\right]-$$

$$\frac{A}{2}\left[\cos\left(\omega_1+\frac{\omega_1+\omega_2}{2}\right)t+\frac{\theta}{2}\right]+$$

$$\frac{B}{2}\left[\cos\left(\frac{\omega_1-\omega_2}{2}\right)t-\frac{\theta}{2}\right]-$$

$$\frac{B}{2}\left[\cos\left(\omega_2+\frac{\omega_1+\omega_2}{2}\right)t+\frac{3\theta}{2}\right]$$

The amplitude of the difference frequency is thus $A+B/2$ which is directly proportional to the depth of modulation.

To measure the depth of modulation, it is convenient, as shown in FIGURE 2, to compare the output of the synchronous detector 30 with the output of a calibrated attenuator 35 which attenuates a direct signal proportional to the carrier signal at the receiver 11. The comparison is effected using a null balance indicator 36, which may conveniently be the meter 21 or meter 31. In FIGURE 2, the 120 c./s. and 30 c./s. reference signals may be provided in exactly the same way as in FIGURE 1, and it will be seen that, apart from the provision of the calibrated attenuator 35 and a detector in the receiver 11 for giving an output proportional to the carrier level, all the components of FIGURE 2 are available in the apparatus of FIGURE 1. In practice, suitable switch means would be provided to enable the apparatus of FIGURE 1 to be switched for measuring modulation depth in the manner of FIGURE 2 but for clarity of explanation the two circuit arrangements have been illustrated separately in FIGURES 1 and 2.

In the above mathematical analysis, it has been assumed that the two input signals, which in the case of the I.L.S. equipment are the 90 c./s. and 150 c./s. modulation signals, are pure sine waves. If they are not pure sine waves, they may be considered by a Fourier analysis as having harmonic components. It may readily be shown however that theoretically such harmonic components cannot produce any output signal at half the difference frequency of the input signals, that is to say at the 30 c./s. for the I.L.S. equipment. In practice, it is readily possible to ensure that even large proportions of harmonics have negligible effect.

FIGURE 3 illustrates how the receiver of FIGURE 1 may be used as a check receiver for monitoring the signals of an I.L.S. system and also for the control of the relative modulation amplitude of the radiated signals in such a system. In FIGURE 3 the I.L.S. system is shown as comprising a carrier frequency generator 40, typically operating at 110 mc./s. and providing outputs which are modulated by two modulators 41, 42 with modulation signals of 90 c./s. and 150 c./s. respectively from modulation signal generators 43, 44. The modulated carrier waves are fed to the transmitters 45, 46 and are radiated by the transmitting antenna 47, 48. The I.L.S. system is used to provide guidance along a course line determined by the equality of the two received modulation signals and, for monitoring and check purposes, it is most convenient to put the check receiver on the required course line to be defined by the radiated signals to confirm that the two modulation signals are equal. The check receiver is indicated diagrammatically in FIGURE 3 as comprising a receiving aerial 50 and a unit 51 which unit comprises the components 11 to 18, 20, 22, 23 and 30 to 32 of FIGURE 1; for convenience in FIGURE 3 the indicating meter 21 is indicated separately. The check receiver is operated as previously described. For monitoring purposes, it is merely necessary to confirm that the meter 21 is reading zero when the switch 15 is set to feed the quadrature output from the reference generator 12 to the balanced modulator 16. Operation of the switch 15 in FIGURE 1 enables the depth of modulation to be measured.

Instead however of using the check receiver merely to check that the I.L.S. transmitting equipment is operating correctly, it may be used as part of an automatic control to maintain the equality of the modulation signals at the location of the check receiver. The output from the synchronous detector 22, for this purpose, may be used to control a servo system 52 which operates a variable gain device 53 controlling the relative amplitudes of the two modulation signals in the transmitting system. In FIGURE 3 the device 53 is illustrated as an adjustable gain control between the 150 c./s. generator 44 and the modulator 42. The servo device 52 adjusts the variable gain 53 so as to tend to keep the output from the receiver 51 at a minimum value. By this simple arrangement there is provided an automatic control of the transmitting system so as to maintain the equality of relative amplitudes of the modulation signals at the location of the check receiver.

FIGURES 4, 5 and 6 illustrate three different arrangements which can be employed as part of the reference signal generator 12. This reference signal generator has to produce a signal having a frequency equal to the mean of the two modulation frequencies.

FIGURE 4 illustrates one simple method of producing the mean frequency signal which is particularly suitable in an I.L.S. system. The 90 and 150 c./s. signals from the receiver 11 are fed into a square law circuit 60 and this will give an output including signals of 60, 180, 240 and 300 c./s. From the output of this square law circuit, the 240 c./s. signal is selected by a band pass filter 61 and is fed into a frequency divider 62 dividing the frequency by a factor of two to produce the required 120 c./s. signal. This can constitute one of the outputs of the reference generator 12. To provide the second output, a quadrature phase shifter may be provided. More conveniently binary divider circuits may be used providing square waves from which a quadrature relationship is readily obtained. It will be particularly noted that the 240 c./s. filter 61 merely has to select a particular frequency. The amplitude of the reference signal, so long as it is sufficient, is immaterial and does not affect the determination of the equality of amplitude of the two modulation signals or affect the phase checking or the determination of the depth of modulation (as described later). It is thus immaterial whether the filter 61 introduces any attenuation and the use of such a signal filter therefore does not produce the disadvantages arising from using filters in the previous types of I.L.S. receivers in which two separate filters are provided for separating the modulation signals which are then prepared in amplitude. Phase shifts due to the filter 61 likewise are immaterial since phase control is provided for the output of the reference signal generator 12.

FIGURE 5 illustrates another arrangement for producing the 120 c./s. reference signal from the 90 and 150 c./s. input signals. In the arrangement of FIGURE 5 the two input signals are separated by band pass filters 70, 71 tuned respectively to 90 c./s. and 150 c./s. These two separated signals are then fed into a balanced modulator 72 which gives an instantaneous output having an amplitude equal to the product of the instantaneous amplitudes of the input signals. The output of this balanced modulator consists of signals at 240 c./s. and 60 c./s., that is to say the sum and the difference frequencies. These are fed through a band pass filter 73 which selects the 240 c./s. signal and this is passed to a frequency divider 74 dividing the frequency by two to produce the required 120 c./s. output. As previously described with reference to FIGURE 4 this output is used to provide the necessary signals from the reference generator 12. It will again be noted that in the arrangement of FIGURE 5 it is immaterial whether any of the filters 70, 71 and 73 introduce attenuation since there is no comparison of the amplitudes of filtered signals.

In the arrangements of FIGURES 4 and 5, because frequency selection of the signals is effected by band pass filters which must have a high Q to be selective, the phase of the output may vary with temperature and with any frequency drift in the input modulation frequencies. This may be immaterial, particularly if an automatic phase control is provided as previously described. However, this difficulty can be avoided by using the arrangement illustrated in FIGURE 6. In FIGURE 6, the 90 and 150 c./s. input signals are separated by band pass filters 80, 81 which are tuned to these respective frequencies. The output from one of these filters, in FIGURE 6 the 150 c./s. filter 81, is fed into a balanced modulator 82 where it is combined with the output from a 240 c./s. frequency controlled oscillator 83. The manner of controlling the frequency of this oscillator will be described later. The output of the balanced modulator 82 will contain signals of the sum and difference frequencies, that is 90 and 390 c./s. If the balanced modulator is not a true multiplier, there may be signals of higher frequencies but there will not be any other signals of frequency lower than 390 c./s. This output from the balanced modulator 82 is fed into a second balanced modulator 84 where it is combined with the output from the 90 c./s. filter 80. The resultant output will contain a direct current component plus various other frequencies. If the oscillator 83 provides an output at exactly the sum of the input frequencies, i.e. 240 c./s., then the direct current output will be zero, assuming that the phase is correct. This direct current component of the output is used as indicated at 85, to adjust the frequency of the oscillator 83 in a sense to tend to bring the direct current component to zero and hence the loop control circuit 85 will serve to maintain the oscillator output at a frequency equal to the sum of the two input frequencies. The 240 c./s. from the output of the oscillator is fed to a frequency divider 86 which divides the frequency by two to provide the required 120 c./s. reference signal. The automatic phase control input 18 of FIGURE 1 is in the form of a direct voltage which may be superimposed on the direct voltage component from the multiplier 84 controlling the oscillator. It will be seen that the arrangement of FIGURE 6 constitutes a reference signal generator in which both the frequency and the phase are automatically controlled to maintain the required conditions.

Although in FIGURE 6 the oscillator is illustrated as operating at 240 c./s., but, more generally, the oscillator may provide a signal of a multiple of the mean frequency of the two input modulations.

In applying the invention to a check receiver for I.L.S. equipment it may, however, be more convenient in some cases to derive the 120 c./s. reference signal directly from the I.L.S. transmitting equipment instead of providing means in the check receiver for deriving this reference signal from the received 90 and 150 c./s. modulation signals. One arrangement for doing this is illustrated in FIGURE 7. In the I.L.S. transmitting equipment the output of an 1800 c./s. oscillator 90 is fed to three frequency dividers 91, 92 and 93 dividing the frequency by factors of 20, 15 and 12 respectively to give outputs of 90, 120 and 150 c./s. The 90 and 120 c./s. signals are additively combined in an adding unit 94 and then fed to one modulator 95 for amplitude-modulating a carrier frequency, typically of 110 mc./s., from a carrier frequency generator 96 to give a modulated output which is radiated from an antenna 97. The 120 and 150 c./s. signals are additively combined in an adding unit 98 and thence fed to a modulator 99 for amplitude-modulating the carrier from the carrier generator 96 to give a second modulated carrier signal which is radiated from an antenna 100. Preferably the phase of the 120 c./s. signal in the two adder units 94 and 98 is quadrature with the mean phase of the 90 and 150 c./s. signals. By mean phase is meant that if one signal is expressed as $A \sin(\omega_1 t - \theta/2)$ and the other as $B \sin(\omega_2 t + \theta/2)$ then $\theta/2$ is the mean phase. The standard practice in I.L.S. equipment is that the phases of the 90 and 150 c./s. signals are arranged so that both pass through zero going in the positive direction simultaneously. In this case, the preferred phase for the 120 c./s. signal is that this 120 c./s. should be at its instantaneous maximum when the 90 and 150 c./s. signals are simultaneously passing through zero. With the arrangement of FIGURE 7, the check receiver which is illustrated diagrammatically by the receiver unit 101 and pick-up aerial 102, can receive directly the 90, 120 and 150 c./s. signals and hence there is no need to provide the reference generator 12 of FIGURE 1, the 120 c./s. being derived directly from the receiver 11.

Alternatively as indicated by the dashed line 103 in FIGURE 7, instead of feeding the 120 c./s. signal to the adding units 94, 98 it might be transmitted by a land line direct to the check receiver. This avoids the use of any additional radiated signals and may be more convenient where the comparison of the amplitudes of two modulations by the arrangement of the present invention is to be used only in a check receiver. On the other hand, if the arrangement of the present invention is to be used as an airborne receiver as described below, it may be more convenient to have the 120 c./s. signal radiated so as to minimize the equipment required on the aircraft.

Although in the foregoing the construction of a check receiver I.L.S. equipment has been more specifically described, it will be immediately apparent that the receiving equipment described above may equally well be used in the aircraft for glide path and course guidance using I.L.S. transmissions. For an airborne receiver the equipment of FIGURE 1 may be simplified in that there is no need to provide any means for checking the depths of modulation of the signals or the relative phase of the signals. A simple form of two state indicator may be used to confirm that the 120 c./s. phase is correct, there being no need to measure this phase. It will be seen that if the meter 21 of FIGURE 1 is a center zero meter it will indicate deviation to left or right of the course line or deviation above or below the glide path in a manner similar to the conventional type of indicating system used for I.L.S. airborne equipment. As previously explained however, since the arrangement of the present invention does not rely on the preservation of the difference of amplitudes of signals through frequency selective filter circuits, equality of amplitude of the input modulation signals can be determined to an extremely high order of accuracy, for example to the order of one part in 5,000 or 10,000, which is very much better than is possible with types of I.L.S. receiving equipment heretofore used.

I claim:

1. Apparatus for comparing the amplitudes of two input signals of different frequencies comprising a signal source providing a reference signal of a frequency exactly midway between that of the two input signals, means for adjusting the phase of the reference signal to produce a phase-adjusted mean frequency signal having its phase in quadrature with the mean phase of the two input signals, a balanced amplitude modulator for modulating the phase-adjusted mean frequency signal with the combined input signals and a detector for detecting the amplitude of the output signal from the balanced modulator at a frequency equal to half the difference between the frequencies of the two input signals.

2. Apparatus for comparing the amplitudes of two input signals of different frequencies comprising means for deriving, from said two input signals, a reference signal of a frequency exactly midway between that of the two input signals, means for adjusting the phase of the reference signal to produce a phase-adjusted mean frequency signal having its phase in quadrature with the mean phase of the two input signals, a balanced modulator for amplitude modulating the phase-adjusted mean frequency signal with the combined input signals and a detector for detecting the amplitude of the output signal from the balanced modulator at a frequency equal to half the difference between the frequencies of the two input signals.

3. Apparatus as claimed in claim 2 wherein said means for deriving the mean frequency reference signal from said two input signals comprises means for combining the two input signals to produce a signal containing components of a frequency equal to the sum and difference frequencies of the two input signals, a filter for separating the sum frequency signal and a frequency divider for dividing the frequency of the separated sum frequency output of the filter by two.

4. Apparatus as claimed in claim 2, wherein the means for deriving the mean frequency reference signal from said two input signals comprises a non-linear circuit the output of which is passed through a filter tuned to twice the mean frequency and a frequency divider.

5. Apparatus as claimed in claim 2 wherein the means for deriving the mean frequency reference signal from said two input signals comprises a controllable frequency generator for producing a signal at approximately twice the mean frequency, means for combining the output of the generator with one of the input signals to produce sum and difference frequencies, means for combining the sum and difference frequencies with the other input signal to produce a control signal, the direct current component of which is used to control the frequency of said generator to minimize the amplitude of said direct current component, and means for obtaining from said generator an output signal, at half the frequency of said output of the generator which is fed to said combining means.

6. In an I.L.S. system having transmitting apparatus radiating first and second modulation signals of different frequencies as amplitude modulations on a carrier; the combination of means in the transmitting apparatus for radiating, as an additional modulation on said carrier, a reference signal of a frequency exactly midway between that of the first and second modulation signals, and a receiver comprising means for receiving and detecting said modulation signals, a balanced modulator for amplitude modulating the received reference signal with the combined first and second modulation signals, and a detector for detecting the amplitude of the output signal from the balanced modulator at a frequency equal to half the difference between the frequencies of the first and second modulation signals.

7. Apparatus as claimed in claim 6 wherein the additional modulation is an amplitude modulation in phase quadrature with the mean phase of the first and second modulation signals.

8. The combination as claimed in claim 6 wherein means are provided in the receiver for adjusting the phase of the reference signal.

9. In an I.L.S. system having transmitting apparatus radiating first and second modulation signals of different frequencies as amplitude modulations on a carrier; the combination of means in the transmitting apparatus for generating a reference signal of a frequency exactly midway between that of the two modulation signals, and a ground check receiver comprising means for receiving and detecting the two modulation signals, means for receiving the reference signal from the transmitting apparatus, a balanced modulator for amplitude modulating the reference signal with the combined modulation signals and a detector for detecting the amplitude of the output signal from the balanced modulator at a frequency equal to half the difference between the frequencies of the two modulation signals.

10. The combination as claimed in claim 9 wherein means are provided in the receiver for adjusting the phase of the reference signal.

11. Apparatus as claimed in claim 1 wherein the detector for detecting the amplitude of the output signals from the balanced modulator is a synchronous detector having a reference signal of a frequency equal to half the difference frequency of the input signals and having a phase such that the detector detects the required output, at half the difference frequency, from the balanced modulator due to amplitude difference of the input signals but discriminates against the quadrature signal due to any unwanted component of this frequency which would arise due to a phase error of the reference signal fed to the balanced modulator.

12. Apparatus as claimed in claim 11 wherein means are provided for changing the phase of the reference signal fed to the balanced modulator by 90° whereby the output of the phase sensitive detector is proportional to the sum of the amplitudes of the two input signals.

13. Apparatus as claimed in claim 11 wherein there is provided a second synchronous detector having a reference signal of the same frequency as that for the first synchronous detector but in quadrature therewith, and means for indicating the output of the second synchronous detector.

14. Apparatus as claimed in claim 13 wherein control means are provided for automatically controlling the phase of the mean frequency reference signal fed to the balanced modulation in accordance with the output of said second synchronous detector so as to tend to bring that output to a minimum.

15. Apparatus as claimed in claim 13 and for use in a system in which the input signals are modulations on a carrier wherein there are provided means for changing the phase of the mean frequency reference signal fed to the balanced modulator by 90° and means for comparing the amplitude of the output of said second synchronous detector with the amplitude of the carrier to determine the depth of modulation.

16. Apparatus as claimed in claim 11 wherein a calibrated shifter is provided for adjusting the phase of the reference signal of half the difference frequency fed to the synchronous detector.

17. Apparatus as claimed in claim 11 and arranged for comparing the amplitudes of two input signals having frequencies such that the mean of the two input frequencies is a multiple of the difference of the two input frequencies and wherein the reference signal for the synchronous detector is derived from the mean frequency reference signal.

18. Apparatus for comparing the amplitudes of two input signals having frequencies such that the mean of the two input frequencies is a multiple of the difference of the two input frequencies comprising means for deriving from said two input signals a reference signal of a frequency exactly the mean of the two input frequencies, means for adjusting the phase of the mean frequency reference signal, a balanced modulator for amplitude modulating the phase-adjusted reference signal with the two input signals, frequency dividing means for obtaining, from said reference signal, a further reference signal of a frequency equal to half the difference between the frequencies of the two input signals, and synchronous detecting means controlled by said further reference signal for detecting the amplitude of the output from the balanced modulator at a frequency equal to half the difference between the frequencies of the two input signals.

19. Apparatus for comparing the amplitudes of two input signals of different frequencies comprising means for deriving from said two input signals a reference signal of a frequency exactly the mean of the two input frequencies, means for adjusting the phase of the mean frequency reference signal, a balanced modulator for amplitude modulating the phase-adjusted reference signal with the two input signals, means for deriving from said two input signals a further reference signal of a frequency equal to half the difference between the frequencies of the two input signals, and synchronous detecting means controlled by said further reference signal for detecting the amplitude of the output from the balanced modulator at a frequency equal to half the difference between the frequencies of the two input signals.

20. Apparatus for comparing the amplitudes of two input signals of different frequencies comprising means for deriving from said two input signals a reference signal of a frequency exactly the mean of the two input frequencies, means for adjusting the phase of the mean frequency reference signal, a balanced modulator for amplitude modulating the phase-adjusted reference signal with the two input signals, means for deriving, from said two input signals, two further reference signals each of a frequency equal to half the difference between the frequencies of the two input signals but in phase quadrature, and two separate synchronous detectors controlled respectively by said two further reference signals for detecting the amplitudes of the two phase quadrature components of the output from the balanced modulator at a frequency equal to half the difference between the frequencies of the two input signals.

21. Apparatus as claimed in claim 20 wherein an adjustable phase shifter is provided for adjusting the phase of said further reference signals.

22. Apparatus for comparing the amplitudes of two input signals of different frequencies comprising a first signal source providing a first reference signal of a frequency equal to the mean of the frequencies of said input signals, a second signal source providing second and third reference signals in phase quadrature with one another and each of a frequency equal to half the difference of the frequencies of the two input signals, first phase adjusting means for adjusting the phase of said first reference signal, second phase adjusting means for adjusting the phases of the second and third reference signals while maintaining the phase quadrature relationship, a balanced modulator for amplitude modulating the phase adjusted first reference signal with the two input signals, and two separate synchronous detectors controlled respectively by said second and third reference signals for detecting the amplitudes of the two phase quadrature components of the output from the balanced modulator at a frequency equal to half the difference between the frequencies of the two input signals.

23. Apparatus as claimed in claim 22 wherein means are provided for automatically controlling said first phase adjusting means in response to the output from one of said synchronous detectors so as to tend to maintain the output from that synchronous detector at a minimum.

24. In an I.L.S. system in which two signals of different frequencies are radiated as modulations on a common carrier, a receiver for comparing the depths of modulation of the two signals comprising means for receiving and detecting the radiated signals to produce a combined input signal containing the two modulation frequencies, means for deriving, from said input signal, a first reference signal of a frequency equal to the mean of the modulation frequencies, means for deriving from said input signal, a second reference signal of a frequency equal to half the difference of the two modulation frequencies, a balanced modulator for amplitude modulating the first reference signal with the combined input signal, and synchronous detecting means controlled by said second reference signal for detecting the output from the balanced modulator at a frequency equal to half the difference between the modulation frequencies.

25. A receiver as claimed in claim 24 wherein phase adjusting means are provided for adjusting the phase of the first reference signal.

26. A receiver as claimed in claim 25 wherein phase adjusting means are provided for adjusting the phase of the second reference signal.

27. In an I.L.S. system in which two signals of different frequencies are radiated as modulations on a common carrier, a receiver for comparing the depths of modulation of the two signals comprising means for receiving and detecting the radiated signals to produce a combined input signal containing the two modulation frequencies, means for deriving, from said input signal, a first reference signal of a frequency equal to the mean of the modulation frequencies, means for deriving, from said input signal, second and third reference signals in phase quadrature and of a frequency equal to half the difference of the two modulation frequencies, a balanced modulator for amplitude modulating the first reference signal with said combined input signal, and two separate synchronous detectors controlled respectively by said second and third reference signals for detecting the amplitudes of the two phase quadrature components of the output from the balanced modulator at a frequency equal to half the difference between the two modulation frequencies.

28. A receiver as claimed in claim 27 wherein there are provided a phase shifter for adjusting the phase of said first reference signal and control means for controlling said phase shifter in response to the output of one of said synchronous detectors so as to keep the output from that synchronous detector at a minimum.

29. A receiver as claimed in claim 28 and arranged for use as a monitor receiver on the guidance course line defined by the I.L.S. system wherein control means are provided for automatically controlling the relative depths of modulation of the radiated signals in response to the output of the other of said synchronous detectors so as to keep that output to a minimum.

30. A receiver as claimed in claim 28 wherein means are provided for adjusting the phase of said second and third reference signals while maintaining them in phase quadrature.

References Cited by the Examiner
UNITED STATES PATENTS

| | | | |
|---|---|---|---|
| 2,193,801 | 3/1940 | Byrne | 325—329 |
| 2,418,284 | 4/1947 | Winchel et al. | 324—140 X |
| 2,924,706 | 2/1960 | Sassler | 325—329 |
| 2,930,891 | 3/1960 | Lakatos | 325—329 |

CHESTER L. JUSTUS, *Primary Examiner.*

H. C. WAMSLEY, *Assistant Examiner.*